US011692837B2

(12) United States Patent
Fowe et al.

(10) Patent No.: US 11,692,837 B2
(45) Date of Patent: Jul. 4, 2023

(54) AUTOMATIC DISCOVERY OF OPTIMAL ROUTES FOR FLYING CARS AND DRONES

(71) Applicant: HERE Global B.V., Eindhoven (NL)

(72) Inventors: James Fowe, Chicago, IL (US); Samuel Radomy, Chicago, IL (US)

(73) Assignee: HERE Global B.V., Eindhoven (NL)

(*) Notice: Subject to any disclaimer, the term of this patent is extended or adjusted under 35 U.S.C. 154(b) by 718 days.

(21) Appl. No.: 15/786,998

(22) Filed: Oct. 18, 2017

(65) Prior Publication Data

US 2019/0113356 A1 Apr. 18, 2019

(51) Int. Cl.
G01C 21/34 (2006.01)
G06Q 10/047 (2023.01)
G06F 16/29 (2019.01)

(52) U.S. Cl.
CPC ..... *G01C 21/3492* (2013.01); *G01C 21/3407* (2013.01); *G06F 16/29* (2019.01); *G06Q 10/047* (2013.01); *B64U 2201/104* (2023.01)

(58) Field of Classification Search
CPC ............ G01C 21/3492; G01C 21/3407; G01C 21/20; G06F 16/29; G06Q 10/047; B64C 2201/145; B64C 2201/14; G08G 1/0112
See application file for complete search history.

(56) References Cited

U.S. PATENT DOCUMENTS

| 9,262,929 | B1 | 2/2016 | Roy et al. | |
|---|---|---|---|---|
| 2007/0299602 | A1* | 12/2007 | Auxer | G08G 1/0104 701/533 |
| 2012/0215432 | A1* | 8/2012 | Uyeki | G01C 21/3492 701/118 |
| 2015/0300835 | A1* | 10/2015 | Fowe | G01C 21/20 701/410 |

(Continued)

FOREIGN PATENT DOCUMENTS

| CN | 105973239 A | 9/2016 |
|---|---|---|
| CN | 106525047 A | 3/2017 |

OTHER PUBLICATIONS

Dolinskaya, Irina Sergeyevna, "Optimal Path Finding in Direction, Location and Time Dependent Environments (Dissertation)", The University of Michigan, 2009, retrieved from < http://users.iems.northwestern.edu/~dolira/dolinskaya_dissertation.pdf >, on Jan. 21, 2018, 172 pages.

*Primary Examiner* — Christian Chace
*Assistant Examiner* — Jordan S Fei
(74) *Attorney, Agent, or Firm* — Alston & Bird LLP

(57) ABSTRACT

One or more potential drone and/or flying car (DFC) corridors are identified based on the topology of a road network. Trajectories traveled by vehicles are determined from a plurality of instances of probe data received from a plurality of vehicle apparatuses onboard the vehicles. A volume of traffic for a path through the road network and corresponding to a potential DFC corridor is determined based on the (Continued)

trajectories. A delay metric for the path through the road network and corresponding to the potential DFC corridor is determined based on the trajectories. A traffic metric is then determined for the path based on a combination of the volume of traffic, the delay metric and a measure of the topology of the road network. The one or more potential DFC corridors are ranked by their corresponding traffic metrics.

20 Claims, 6 Drawing Sheets

(56) References Cited

U.S. PATENT DOCUMENTS

| | | | |
|---|---|---|---|
| 2016/0223351 A1* | 8/2016 | Sasse | G01C 21/3461 |
| 2016/0332748 A1 | 11/2016 | Wang | |
| 2017/0160735 A1 | 6/2017 | Mikan et al. | |
| 2017/0197710 A1 | 7/2017 | Ma | |
| 2018/0209811 A1* | 7/2018 | Olsen | G01C 21/3697 |
| 2018/0293898 A1* | 10/2018 | Redmann | G08G 5/0013 |
| 2019/0011934 A1* | 1/2019 | DeBitetto | G05D 1/102 |
| 2019/0271550 A1* | 9/2019 | Breed | G01S 19/49 |

* cited by examiner

|   | A | B | C | D | E | F |
|---|---|---|---|---|---|---|
| A | x | 1.5 | 3.6 | 4.7 | 5.6 | 8.8 |
| B |   | x | 2.1 | 3.2 | 4.1 | 7.3 |
| C |   |   | x | 1.1 | 2.0 | 5.2 |
| D |   |   |   | x | 0.9 | 4.1 |
| E |   |   |   |   | x | 3.2 |
| F |   |   |   |   |   | x |

|   | A | B | C | D | E | F |
|---|---|---|---|---|---|---|
| A | x | 1 | 1 | 1 | 1 | 1 |
| B |   | x | 1 | 1 | 1 | 1 |
| C |   |   | x | 1 | 1 | 1 |
| D |   |   |   | x | 1 | 1 |
| E |   |   |   |   | x | 1 |
| F |   |   |   |   |   | x |

AUTOMATIC DISCOVERY OF OPTIMAL ROUTES FOR FLYING CARS AND DRONES

TECHNOLOGICAL FIELD

An example embodiment relates generally to the identification of routes for flying cars and drones. An example embodiment relates generally to identifying optimal routes for flying cars and drones based on an existing road network.

BACKGROUND

Emerging technologies point toward the use of drones for package deliveries or other logistic operations and the potential of flying cars for intra or inter city transportation. However, determining where driving corridors for drones and flying cars should be located is a complicated city and transportation network planning problem.

BRIEF SUMMARY OF SOME EXAMPLE EMBODIMENTS

Various embodiments are directed to identifying potential drone and/or flying car (DFC) corridors based on the topology of an existing road network. Each potential DFC corridor corresponds to an origin-destination (OD) pair, with each origin and destination corresponding to a node or point of interest in the existing road network. Various embodiments are directed to ranking the identified potential DFC corridors with regard to how well the potential DFC corridors augment the existing road network. In an example embodiment, the ranking of the potential DFC corridors is based on a traffic metric corresponding to the OD pair of the corresponding potential DFC corridor. In an example embodiment, the traffic metric corresponding to a potential DFC corridor is determined based on a volume of traffic along a path through the road network and corresponding to the OD pair of the potential DFC corridor, traffic conditions along the path through the road network and corresponding to the OD pair of the potential DFC corridor, the topology of the road network, and/or the like, and/or a combination thereof. The ranked potential DFC corridors may be provided in a list format, in an example embodiment. In an example embodiment, potential DFC corridor records may be generated such that at least one of the ranked potential DFC corridors (e.g., the highest ranked potential DFC corridor(s)) may be displayed in a layer of a digital map or used as input for one or more city and/or transportation network planning simulations, calculations, and/or the like. The ranked potential DFC corridors may be used to perform one or more city and/or transportation network planning processes and/or procedures without introducing the human bias of human selected and/or ranked potential DFC corridors.

In an example embodiment, one or more potential DFC corridors are identified based on the topology of the at least a portion of the road network. Each potential DFC corridor of the one or more potential DFC corridors corresponds to an OD pair comprising (a) an origin node or point of interest in the at least a portion of the road network and (b) a destination node or point of interest in the at least a portion of the road network. A plurality of instances of probe data is received from a plurality of vehicle apparatuses. Each vehicle apparatus is onboard a vehicle. Each vehicle apparatus comprises a location sensor. Each instance of probe data comprises position data, wherein the position data indicates a location of the vehicle at a time when the position data was captured and is determined by the location sensor. Trajectories traveled by one or more vehicle apparatuses of the plurality of vehicle apparatuses are determined. The determining of the trajectories is based at least in part on the plurality of instances of probe data and map data encoding the topology of the road network. Based on the trajectories, a volume of traffic for a path through the at least a portion of the road network corresponding to the OD pair is determined for each potential DFC corridor of the one or more potential DFC corridors. Based on the trajectories and instances of probe information/data corresponding to the trajectories, a delay metric indicating traffic conditions along the path through the at least a portion of the road network corresponding to the OD pair is determined for each potential DFC corridor of the one or more potential DFC corridors. A traffic metric for the path through the at least a portion of the road network corresponding to the OD pair is determined for each potential DFC corridor of the one or more potential DFC corridors. The traffic metric determined based on a combination of the volume of traffic, the delay metric, and a measure of the topology of the road network. The one or more potential DFC corridors are ranked based on the corresponding traffic metrics.

In accordance with an example embodiment, a method is provided. In an example embodiment, the method comprises identifying, by a corridor determination apparatus comprising a processor, a memory storing map data encoding a topology of at least a portion of a road network, and a communication interface configured to communicate via at least one network, one or more potential DFC corridors based on the topology of the at least a portion of the road network. Each potential DFC corridor of the one or more potential DFC corridors corresponds to an OD pair comprising (a) an origin node or point of interest in the at least a portion of the road network and (b) a destination node or point of interest in the at least a portion of the road network. The method further comprises receiving, by the corridor determination apparatus, a plurality of instances of probe data from a plurality of vehicle apparatuses. Each vehicle apparatus is onboard a vehicle. Each vehicle apparatus comprises a location sensor. Each instance of probe data comprises position data, the position data indicates a location of the vehicle at a time when the position data was captured and is determined by the location sensor. The method further comprises determining, by the corridor determination apparatus, trajectories traveled by one or more vehicle apparatuses of the plurality of vehicle apparatuses. The determining of the trajectories is based at least in part on the plurality of instances of probe data and the map data. The method further comprises determining, by the corridor determination apparatus and based on the trajectories, a volume of traffic for a path through the at least a portion of the road network corresponding to the OD pair for each potential DFC corridor of the one or more potential DFC corridors; determining, by the corridor determination apparatus and based on the trajectories and instances of probe data corresponding to the trajectories, a delay metric indicating traffic conditions along the path through the at least a portion of the road network corresponding to the OD pair for each potential DFC corridor of the one or more potential DFC corridors; and determining, by the corridor determination apparatus, a traffic metric for the path through the at least a portion of the road network corresponding to the OD pair for each potential DFC corridor of the one or more potential DFC corridors. The traffic metric is determined based on a combination of the volume of traffic, the delay metric, and a measure of the topology of the road network. The method further comprises ranking the one or more potential DFC corridors based on the corresponding traffic metrics.

In an example embodiment, the method further comprises generating an OD matrix based on the trajectories, the OD matrix providing at least one of (a) volume of traffic data for OD pairs of the OD matrix or (b) a travel time indicator for OD pairs of the OD matrix, wherein at least one of (a) the volume of traffic for a path through the at least a portion of the road network from the origin node or point of interest and to the destination node or point of interest of each potential DFC corridor of the one or more potential DFC corridors is determined based on the OD matrix or (b) the delay metric indicating traffic conditions along the path through the at least a portion of the road network from the origin node or point of interest and to the destination node or point of interest of each potential DFC corridor of the one or more potential DFC corridors is determined based on the OD matrix. In an example embodiment, the method further comprises generating one or more microscopic OD matrices based on corresponding trajectories, the microscopic OD matrix providing at least one of (a) an indication of a vehicle corresponding to a trajectory traveling along a path of the road network, or (b) a travel time for the vehicle to travel along the path of the road network, wherein the OD matrix is generated by aggregating the one or more microscopic OD matrices.

In an example embodiment, the volume of traffic provides an indication of the number of unique vehicles traveling along a first path through the at least a portion of the road network from a first origin node or point of interest and to a first destination node or point of interest of a first potential DFC corridor of the one or more potential DFC corridors. In an example embodiment, the delay metric is a delay multiple metric. In an example embodiment, the delay multiple metric for a path corresponding to an OD pair is a ratio of an actual travel time, as indicated by one or more trajectories, along a path corresponding to the OD pair and in the road network, to the free flow travel time along the path corresponding to the OD pair and in the road network. In an example embodiment, the measure of the topology of the road network is an extra length driven or an extra travel time driven. In an example embodiment, the extra length driven is determined by the difference in length of a road network path through the road network from the origin of the first OD pair and to the destination of the first OD pair and the extra travel time driven for a first OD pair is determined by dividing the difference in length of a road network path through the road network from the origin of the first OD pair and to the destination of the first OD pair and a direct path from the origin of the first OD pair and to the destination of the first OD pair divided by the free flow speed along the road network path.

In an example embodiment, the method further comprises providing the ranked potential DFC corridors for display via a user interface or as input to a city and/or transportation network planning calculation. In an example embodiment, the method further comprises generating potential DFC corridor records for one or more highly ranked potential DFC corridors; and providing the potential DFC corridor records for adding to the map data, the potential DFC corridor records configured to provide display of the corresponding potential DFC corridors as a layer of a digital map. In an example embodiment, a first path through the at least a portion of the road network corresponding to a first OD pair is (a) the shortest path through the at least a portion of the road network from the origin node or point of interest to the destination node or point of interest of the first OD pair or (b) the fastest path through the at least a portion of the road network from the origin node or point of interest to the destination node or point of interest of the first OD pair.

In accordance with an example embodiment, an apparatus is provided. In an example embodiment, the apparatus comprises at least one processor, a communications interface configured for communicating via at least one network, and at least one memory storing (a) computer program code and (b) map data encoding a topology of at least a portion of a road network. The at least one memory and the computer program code are configured to, with the processor, cause the apparatus to at least identify one or more potential DFC corridors based on the topology of the at least a portion of the road network, each potential DFC corridor of the one or more potential DFC corridors corresponding to an OD pair comprising (a) an origin node or point of interest in the at least a portion of the road network and (b) a destination node or point of interest in the at least a portion of the road network. The at least one memory and the computer program code are further configured to, with the processor, cause the apparatus to at least receive, via the communication interface, a plurality of instances of probe data from a plurality of vehicle apparatuses. Each vehicle apparatus is onboard a vehicle. Each vehicle apparatus comprises a location sensor. Each instance of probe data comprises position data, wherein the position data indicates a location of the vehicle at a time when the position data was captured and is determined by the location sensor. The at least one memory and the computer program code are further configured to, with the processor, cause the apparatus to at least determine trajectories traveled by one or more vehicle apparatuses of the plurality of vehicle apparatuses, the determining of the trajectories based at least in part on the plurality of instances of probe data and the map data; determine, based on the trajectories, a volume of traffic for a path through the at least a portion of the road network corresponding to the OD pair for each potential DFC corridor of the one or more potential DFC corridors; determine, based on the trajectories and instances of probe information/data corresponding to the trajectories, a delay metric indicating traffic conditions along the path through the at least a portion of the road network corresponding to the OD pair for each potential DFC corridor of the one or more potential DFC corridors; and determine a traffic metric for the path through the at least a portion of the road network corresponding to the OD pair for each potential DFC corridor of the one or more potential DFC corridors. The traffic metric determined based on a combination of the volume of traffic, the delay metric, and a measure of the topology of the road network. The at least one memory and the computer program code are further configured to, with the processor, cause the apparatus to at least rank the one or more potential DFC corridors based on the corresponding traffic metrics.

In an example embodiment, the at least one memory and the computer program code are further configured to, with the processor, cause the apparatus to at least generate an OD matrix based on the trajectories, the OD matrix providing at least one of (a) volume of traffic data for OD pairs of the OD matrix or (b) a travel time indicator for OD pairs of the OD matrix, wherein at least one of (a) the volume of traffic for a path through the at least a portion of the road network from the origin node or point of interest and to the destination node or point of interest of each potential DFC corridor of the one or more potential DFC corridors is determined based on the OD matrix or (b) the delay metric indicating traffic conditions along the path through the at least a portion of the road network from the origin node or point of interest and to the destination node or point of interest of each potential DFC corridor of the one or more potential DFC corridors is determined based on the OD matrix. In an example embodiment, the at least one memory and the computer program code are further configured to, with the processor, cause the apparatus to at least generate one or more microscopic OD matrices based on corresponding trajectories, the microscopic OD matrix providing at least one of (a) an indication of a vehicle corresponding to a trajectory traveling along a path of the road network, or (b) a travel time for the vehicle to travel along the path of the road network, wherein the OD matrix is generated by aggregating the one or more microscopic OD matrices.

In an example embodiment, the volume of traffic provides an indication of the number of unique vehicles traveling along a first path through the at least a portion of the road network from a first origin node or point of interest and to a first destination node or point of interest of a first potential DFC corridor of the one or more potential DFC corridors. In an example embodiment, the delay metric is a delay multiple metric. In an example embodiment, the delay multiple metric for a path corresponding to an OD pair is a ratio of an actual travel time, as indicated by one or more trajectories, along a path corresponding to the OD pair and in the road network, to the free flow travel time along the path corresponding to the OD pair and in the road network. In an example embodiment, the measure of the topology of the road network is an extra length driven or an extra travel time driven. In an example embodiment, the extra length driven is determined by the difference in length of a road network path through the road network from the origin of the first OD pair and to the destination of the first OD pair and the extra travel time driven for a first OD pair is determined by dividing the difference in length of a road network path through the road network from the origin of the first OD pair and to the destination of the first OD pair and a direct path from the origin of the first OD pair and to the destination of the first OD pair divided by the free flow speed along the road network path.

In an example embodiment, the at least one memory and the computer program code are further configured to, with the processor, cause the apparatus to at least provide the ranked potential DFC corridors for display via a user interface or as input to a city and/or transportation network planning calculation. In an example embodiment, the at least one memory and the computer program code are further configured to, with the processor, cause the apparatus to at least generate potential DFC corridor records for one or more highly ranked potential DFC corridors; and provide the potential DFC corridor records for adding to the map data, the potential DFC corridor records configured to provide display of the corresponding potential DFC corridors as a layer of a digital map. In an example embodiment, a first path through the at least a portion of the road network corresponding to a first OD pair is (a) the shortest path through the at least a portion of the road network from the origin node or point of interest to the destination node or point of interest of the first OD pair or (b) the fastest path through the at least a portion of the road network from the origin node or point of interest to the destination node or point of interest of the first OD pair.

In accordance with an example embodiment, a computer program product is provided. In an example embodiment, the computer program product comprises at least one non-transitory computer-readable storage medium having computer-executable program code instructions stored therein. The computer-executable program code instructions comprise program code instructions configured to identify one or more potential DFC corridors based on map data encoding a topology of at least a portion of the road network. Each potential DFC corridor of the one or more potential DFC corridors corresponds to an OD pair comprising (a) an origin node or point of interest in the at least a portion of the road network and (b) a destination node or point of interest in the at least a portion of the road network. The computer-executable program code instructions further comprise program code instructions configured to receive a plurality of instances of probe data from a plurality of vehicle apparatuses. Each vehicle apparatus is onboard a vehicle. Each vehicle apparatus comprises a location sensor. Each instance of probe data comprises position data, the position data indicates a location of the vehicle at a time when the position data was captured and is determined by the location sensor. The computer-executable program code instructions further comprise program code instructions configured to determine trajectories traveled by one or more vehicle apparatuses of the plurality of vehicle apparatuses, the determining of the trajectories based at least in part on the plurality of instances of probe data and the map data; determine, based on the trajectories, a volume of traffic for a path through the at least a portion of the road network corresponding to the OD pair for each potential DFC corridor of the one or more potential DFC corridors; determine, based on the trajectories and instances of probe data corresponding to the trajectories, a delay metric indicating traffic conditions along the path through the at least a portion of the road network corresponding to the OD pair for each potential DFC corridor of the one or more potential DFC corridors; and determine a traffic metric for the path through the at least a portion of the road network corresponding to the OD pair for each potential DFC corridor of the one or more potential DFC corridors, the traffic metric determined based on a combination of the volume of traffic, the delay metric, and a measure of the topology of the road network. The computer-executable program code instructions further comprise program code instructions configured to rank the one or more potential DFC corridors based on the corresponding traffic metrics.

In an example embodiment, the computer-executable program code instructions further comprise program code instructions configured to generate an OD matrix based on the trajectories, the OD matrix providing at least one of (a) volume of traffic data for OD pairs of the OD matrix or (b) a travel time indicator for OD pairs of the OD matrix, wherein at least one of (a) the volume of traffic for a path through the at least a portion of the road network from the origin node or point of interest and to the destination node or point of interest of each potential DFC corridor of the one or more potential DFC corridors is determined based on the OD matrix or (b) the delay metric indicating traffic conditions along the path through the at least a portion of the road network from the origin node or point of interest and to the destination node or point of interest of each potential DFC corridor of the one or more potential DFC corridors is determined based on the OD matrix. In an example embodiment, the computer-executable program code instructions further comprise program code instructions configured to generate one or more microscopic OD matrices based on corresponding trajectories, the microscopic OD matrix providing at least one of (a) an indication of a vehicle corresponding to a trajectory traveling along a path of the road network, or (b) a travel time for the vehicle to travel along the path of the road network, wherein the OD matrix is generated by aggregating the one or more microscopic OD matrices.

In an example embodiment, the volume of traffic provides an indication of the number of unique vehicles traveling along a first path through the at least a portion of the road network from a first origin node or point of interest and to a first destination node or point of interest of a first potential DFC corridor of the one or more potential DFC corridors. In an example embodiment, the delay metric is a delay multiple metric. In an example embodiment, the delay multiple metric for a path corresponding to an OD pair is a ratio of an actual travel time, as indicated by one or more trajectories, along a path corresponding to the OD pair and in the road network, to the free flow travel time along the path corresponding to the OD pair and in the road network. In an example embodiment, the measure of the topology of the road network is an extra length driven or an extra travel time driven. In an example embodiment, the extra length driven is determined by the difference in length of a road network path through the road network from the origin of the first OD pair and to the destination of the first OD pair and the extra travel time driven for a first OD pair is determined by dividing the difference in length of a road network path through the road network from the origin of the first OD pair and to the destination of the first OD pair and a direct path from the origin of the first OD pair and to the destination of the first OD pair divided by the free flow speed along the road network path.

In an example embodiment, the computer-executable program code instructions further comprise program code instructions configured to provide the ranked potential DFC corridors for display via a user interface or as input to a city and/or transportation network planning calculation. In an example embodiment, the computer-executable program code instructions further comprise program code instructions configured to generate potential DFC corridor records for one or more highly ranked potential DFC corridors; and provide the potential DFC corridor records for adding to the map data, the potential DFC corridor records configured to provide display of the corresponding potential DFC corridors as a layer of a digital map. In an example embodiment, a first path through the at least a portion of the road network corresponding to a first OD pair is (a) the shortest path through the at least a portion of the road network from the origin node or point of interest to the destination node or point of interest of the first OD pair or (b) the fastest path through the at least a portion of the road network from the origin node or point of interest to the destination node or point of interest of the first OD pair.

In accordance with yet another example embodiment of the present invention, an apparatus is provided that comprises means for identifying one or more potential DFC corridors based on the topology of the at least a portion of the road network. Each potential DFC corridor of the one or more potential DFC corridors corresponds to an OD pair comprising (a) an origin node or point of interest in the at least a portion of the road network and (b) a destination node or point of interest in the at least a portion of the road network. The apparatus further comprises means for receiving a plurality of instances of probe data from a plurality of vehicle apparatuses. Each vehicle apparatus is onboard a vehicle. Each vehicle apparatus comprises a location sensor. Each instance of probe data comprises position data, the position data indicates a location of the vehicle at a time when the position data was captured and is determined by the location sensor. The apparatus further comprises means for determining trajectories traveled by one or more vehicle apparatuses of the plurality of vehicle apparatuses. The determining of the trajectories is based at least in part on the plurality of instances of probe data and the map data. The apparatus further comprises means for determining, based on the trajectories, a volume of traffic for a path through the at least a portion of the road network corresponding to the OD pair for each potential DFC corridor of the one or more potential DFC corridors. The apparatus further comprises means for determining, based on the trajectories and instances of probe data corresponding to the trajectories, a delay metric indicating traffic conditions along the path through the at least a portion of the road network corresponding to the OD pair for each potential DFC corridor of the one or more potential DFC corridors. The apparatus further comprises means for determining a traffic metric for the path through the at least a portion of the road network corresponding to the OD pair for each potential DFC corridor of the one or more potential DFC corridors. The traffic metric is determined based on a combination of the volume of traffic, the delay metric, and a measure of the topology of the road network. The apparatus further comprises means for ranking the one or more potential DFC corridors based on the corresponding traffic metrics.

In accordance with another embodiment, method for identifying one or more potential DFC corridors to augment an existing road network is provided. In an example embodiment the method comprises analyzing a plurality of instances of probe data provided by a plurality of vehicle apparatuses, wherein (a) each vehicle apparatus is onboard a vehicle, (b) each vehicle apparatus comprises a location sensor, (c) each instance of probe data was captured as the vehicle traveled through the existing road network, and (d) each instance of probe data comprises position data, the position data indicates a location of the vehicle at a time when the position data was captured and is determined by the location sensor, the analysis performed by a corridor determination apparatus comprising a processor and a memory storing map data encoding a topology of at least a portion of the existing road network; and based on the map data encoding the topology of the at least a portion of the existing road network and the analysis of the plurality of instances of probe data, identifying, by the corridor determination apparatus, one or more potential DFC corridors.

In accordance with another embodiment, an apparatus for identifying one or more potential DFC to augment an existing road network is provided. In an example embodiment, the apparatus comprises at least one processor and at least one memory storing (a) computer program code and (b) map data encoding a topology of at least a portion of the existing road network. The at least one memory and the computer program code are configured to, with the processor, cause the apparatus to at least analyze a plurality of instances of probe data provided by a plurality of vehicle apparatuses, wherein (a) each vehicle apparatus is onboard a vehicle, (b) each vehicle apparatus comprises a location sensor, (c) each instance of probe data was captured as the vehicle traveled through the existing road network, and (d) each instance of probe data comprises position data, the position data indicates a location of the vehicle at a time when the position data was captured and is determined by the location sensor; and based on the map data encoding the topology of the at least a portion of the existing road network and the analysis of the plurality of instances of probe data, identifying one or more potential DFC corridors.

In accordance with an example embodiment, a computer program product is provided. In an example embodiment, the computer program product comprises at least one non-transitory computer-readable storage medium having computer-executable program code instructions stored therein. The computer-executable program code instructions comprise program code instructions configured to analyze a plurality of instances of probe data provided by a plurality of vehicle apparatuses, wherein (a) each vehicle apparatus is onboard a vehicle, (b) each vehicle apparatus comprises a location sensor, (c) each instance of probe data was captured as the vehicle traveled through an existing road network, and (d) each instance of probe data comprises position data, the position data indicates a location of the vehicle at a time when the position data was captured and is determined by the location sensor; and based on map data encoding a topology of at least a portion of the existing road network and the analysis of the plurality of instances of probe data, identifying one or more potential DFC corridors.

In accordance with yet another example embodiment of the present invention, an apparatus is provided that comprises means for identifying one or more potential DFC corridors based on the topology of the at least a portion of an existing road network. In an example embodiment, the apparatus comprises means for analyzing a plurality of instances of probe data provided by a plurality of vehicle apparatuses, wherein (a) each vehicle apparatus is onboard a vehicle, (b) each vehicle apparatus comprises a location sensor, (c) each instance of probe data was captured as the vehicle traveled through the existing road network, and (d) each instance of probe data comprises position data, the position data indicates a location of the vehicle at a time when the position data was captured and is determined by the location sensor. The apparatus further comprises means for, based on map data encoding a topology of at least a portion of the existing road network and the analysis of the plurality of instances of probe data, identifying one or more potential DFC corridors.

BRIEF DESCRIPTION OF THE DRAWINGS

Figure 1:
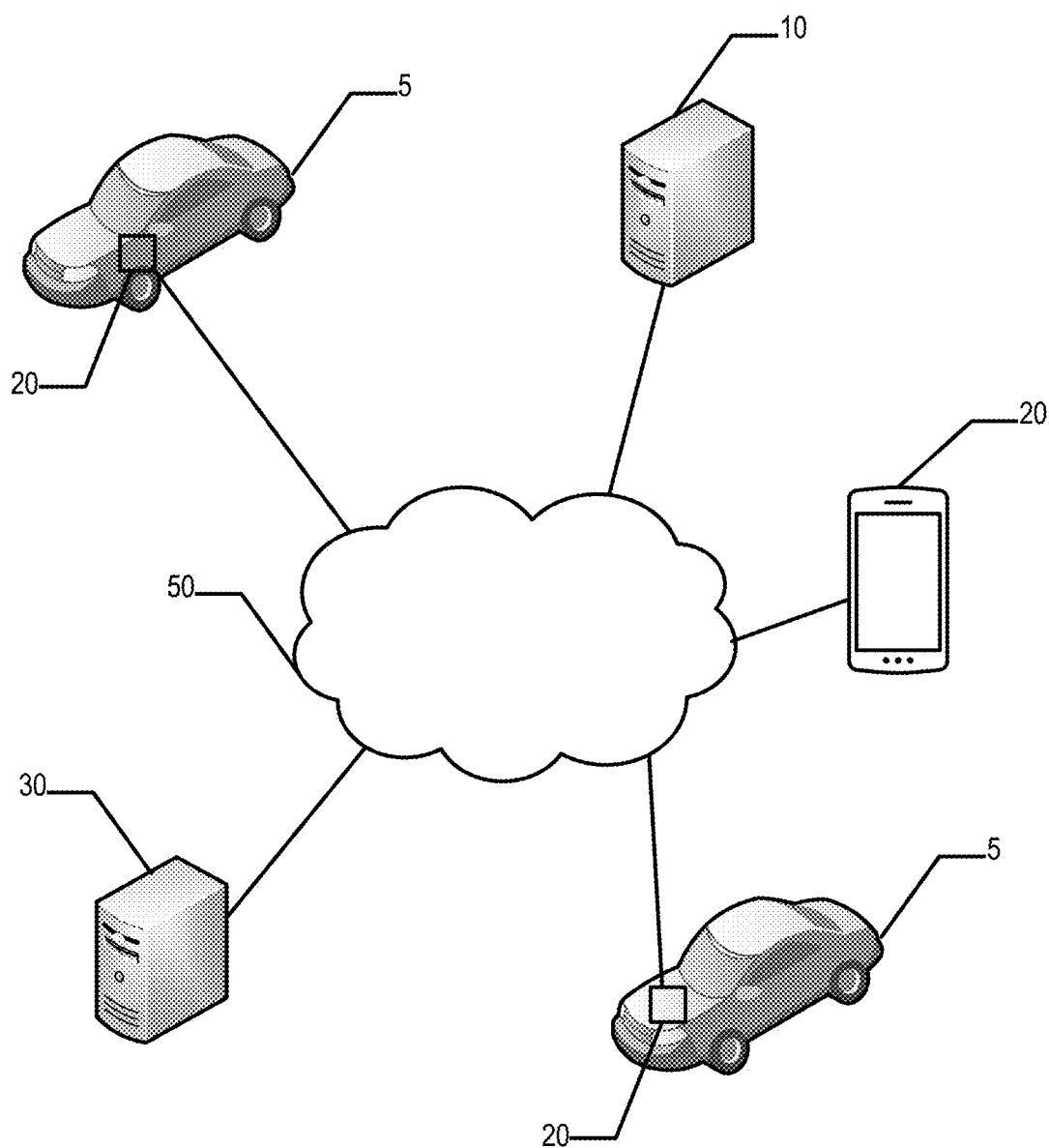
Figure 2A:
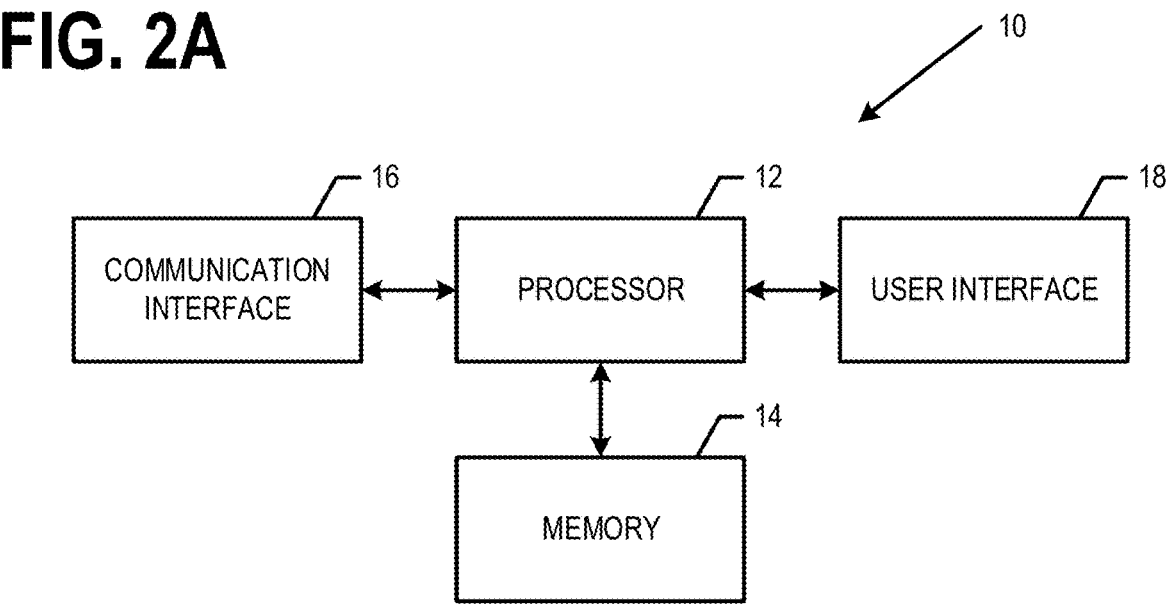
Figure 2B:
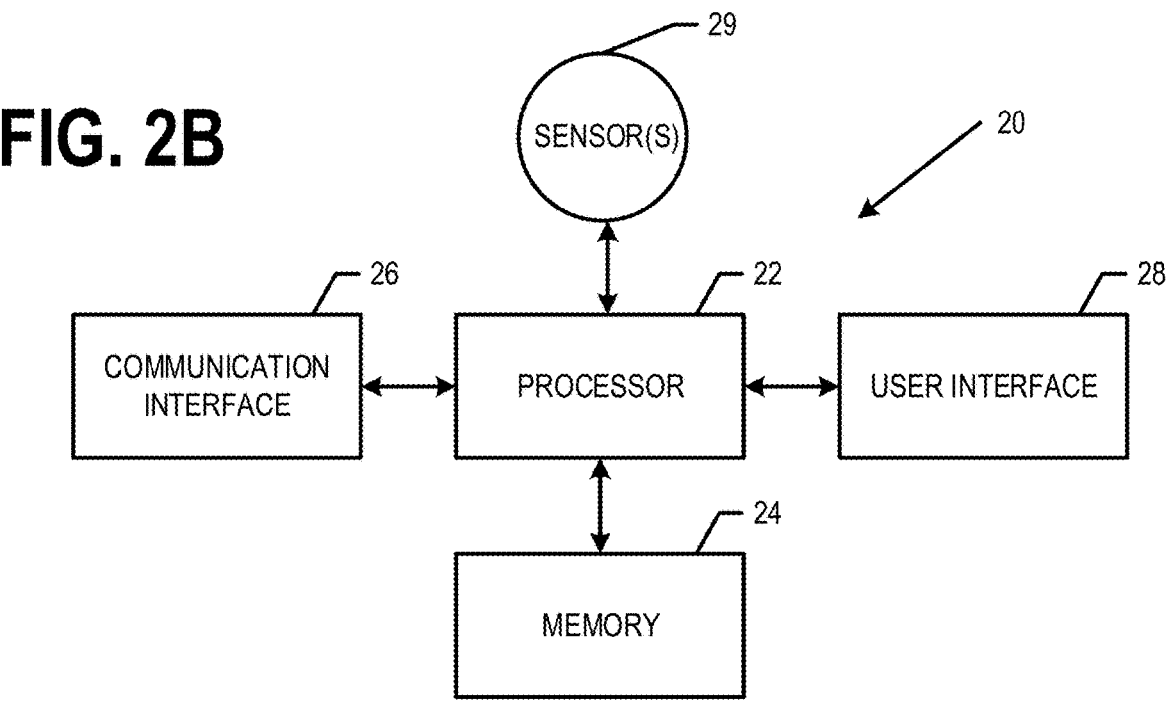
Figure 3:
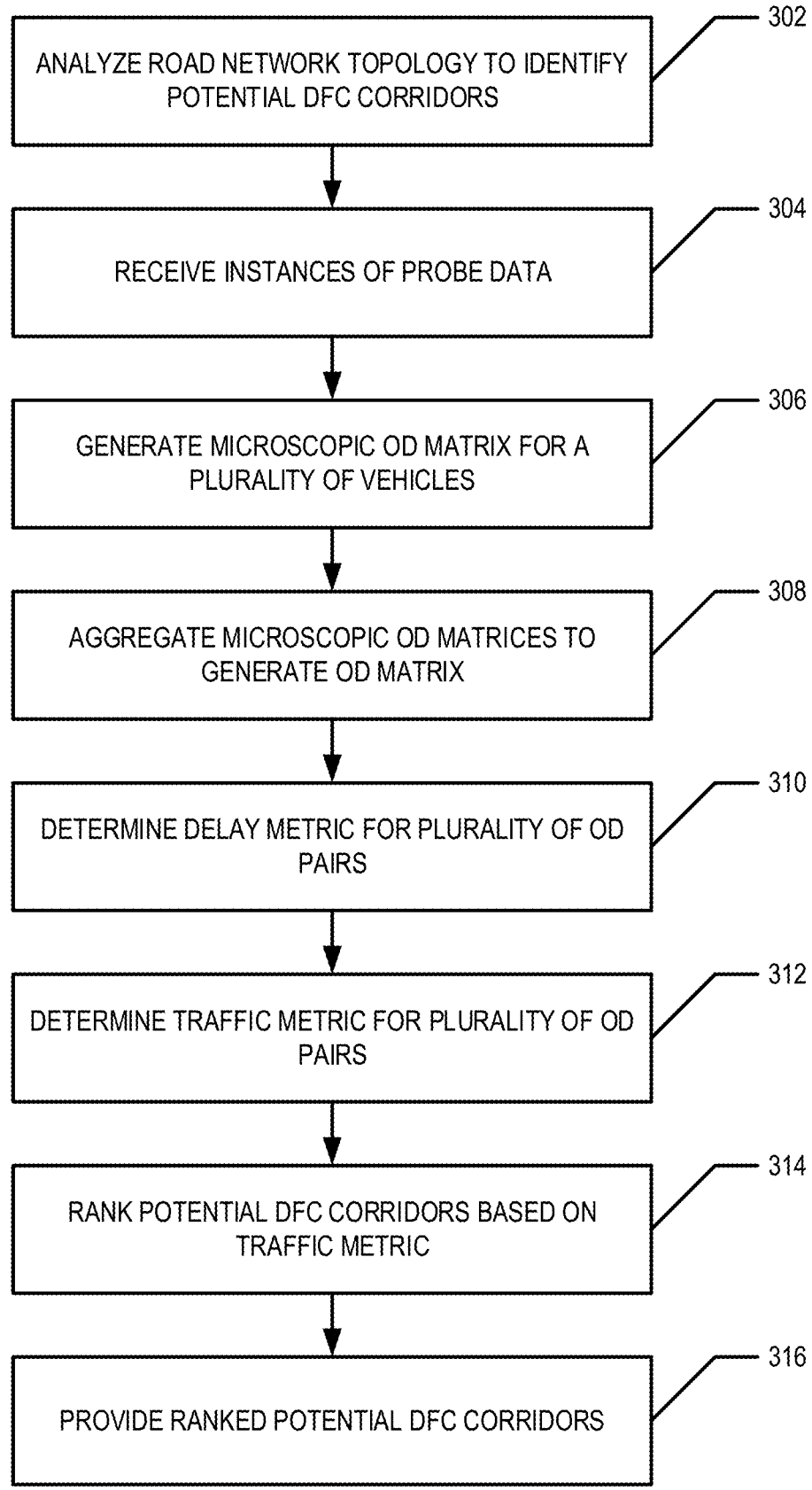
Figures 4A, 4B, 4C:
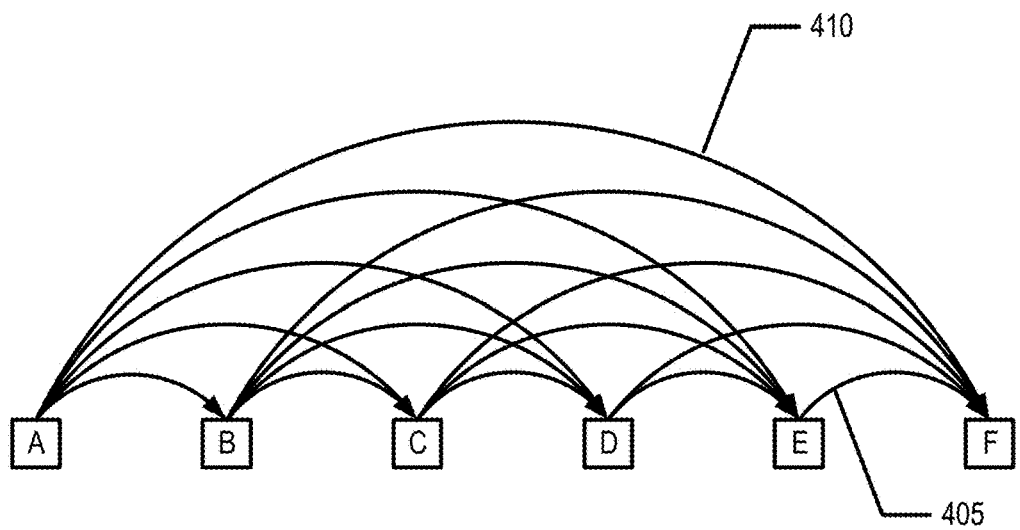
Figure 5A:
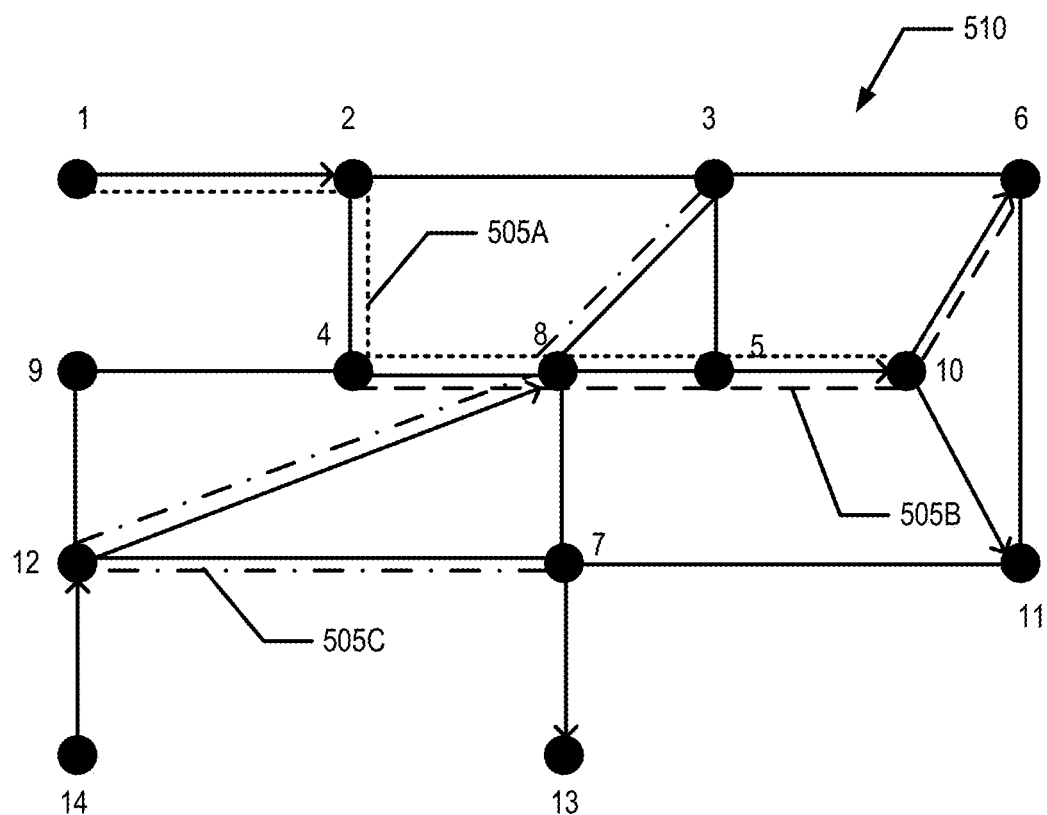
Figure 5B:
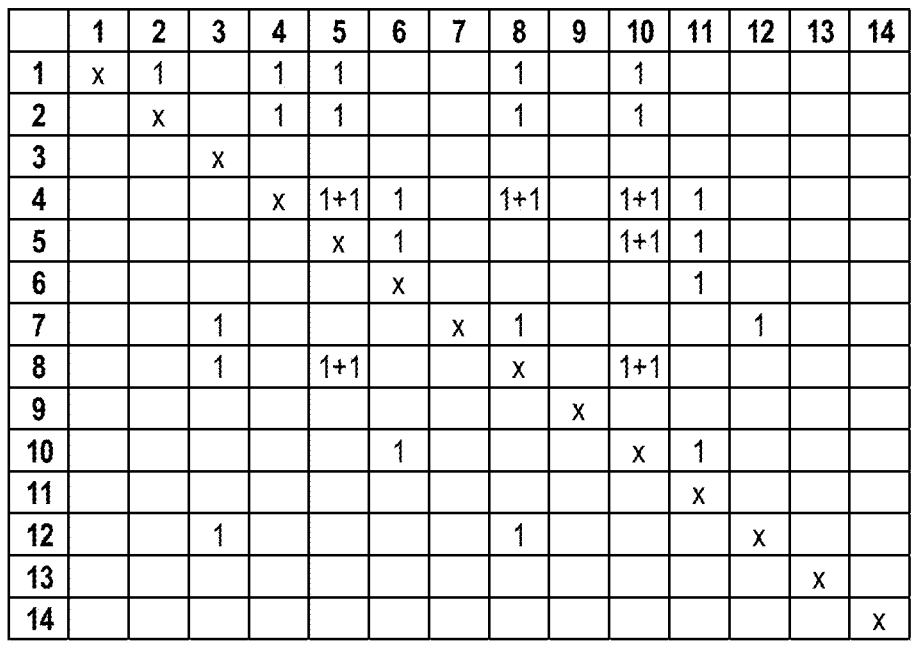
Figure 6:
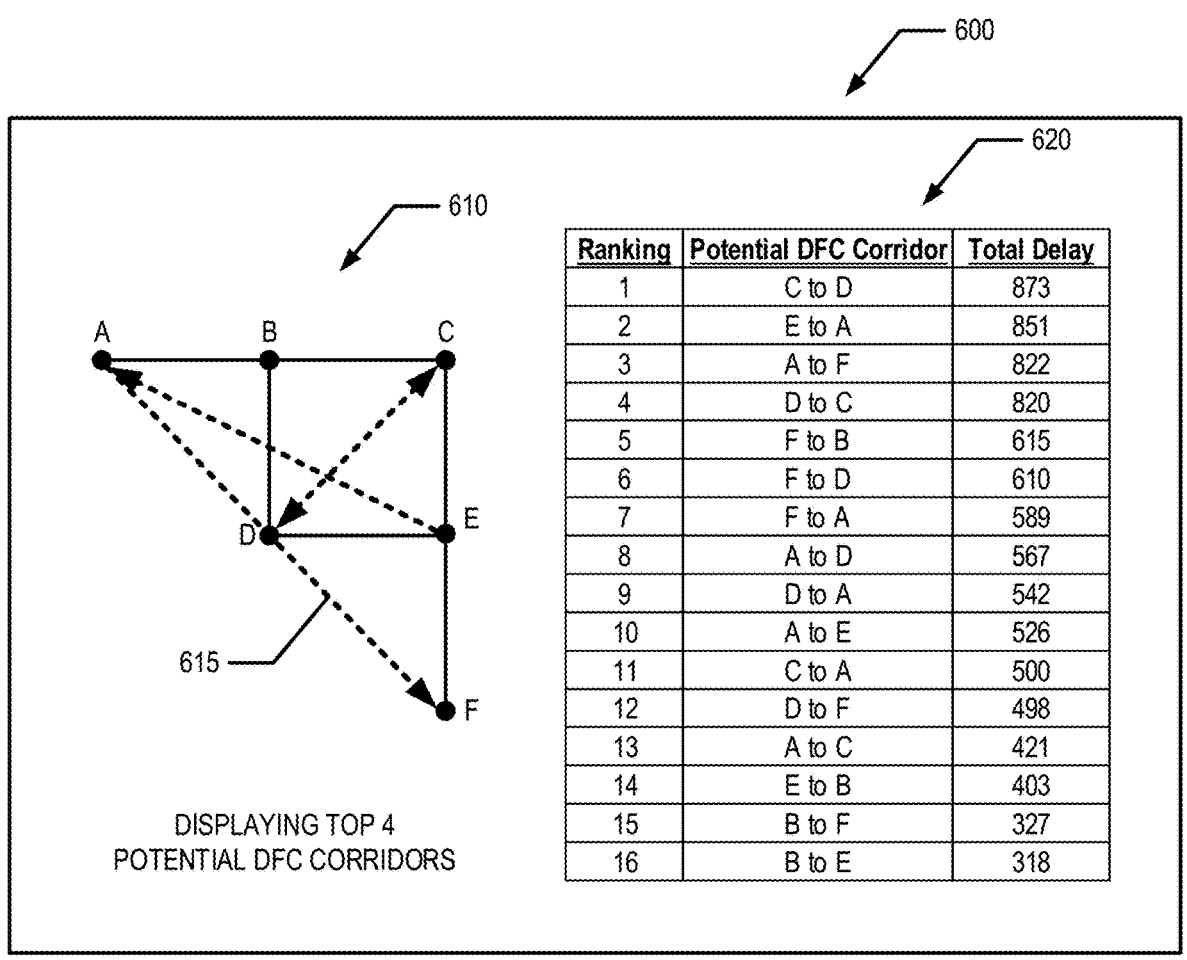

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of a corridor determination apparatus that may be specifically configured in accordance with an example embodiment;

FIG. 2B is a block diagram of a vehicle apparatus that may be specifically configured in accordance with an example embodiment;

FIG. 3 is a flowchart illustrating operations performed, such as by the corridor determination apparatus of FIG. 2A to identify one or more potential DFC corridors, in accordance with an example embodiment;

FIG. 4A is a schematic diagram illustrating how probe data corresponding to a vehicle trajectory may be used to generate a microscopic OD matrix, in accordance with an example embodiment;

FIGS. 4B and 4C are example microscopic OD matrices corresponding to the diagram of FIG. 4A, in accordance with an example embodiment;

FIG. 5A is a schematic diagram of an example road network section, in accordance with an example embodiment;

FIG. 5B is an example OD matrix corresponding to the diagram of FIG. 5B, in accordance with an example embodiment; and FIG. 6 shows an example screen view of an example graphical user interface for displaying potential DFC corridors, in accordance with an example embodiment.

DETAILED DESCRIPTION OF SOME EXAMPLE EMBODIMENTS

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

I. General Overview

Methods, apparatus and computer program products are provided in accordance with an example embodiment in order to determine, identify, and/or generate a one or more potential DFC corridors. In an example embodiment, one or more determined, identified, and/or generated potential DFC corridors may be ranked such that potential DFC corridors providing the greatest advantage to DFCs and/or traditional vehicle traffic may be identified. For example, the potential DFC corridors may be ranked to indicate which of the potential DFC corridors best augment the existing road network. In an example embodiment, a plurality of vehicle apparatuses are each onboard a vehicle. In an example embodiment, each vehicle apparatus provides a plurality of instances of probe information/data as the corresponding vehicle moves through the existing road network and/or a portion thereof. The corridor determination apparatus receives the plurality of instances of probe information/data from the plurality of vehicle apparatuses (and/or an intermediary computing entity and/or network). Based on the plurality of instances of probe information/data from the plurality of vehicle apparatuses and the road network topology, the corridor determination apparatus may identify one or more potential DFC corridors and rank the one or more potential DFC corridors, according to various embodiments.

For example, a plurality of potential DFC corridors corresponding to a road network and may be identified based on the topology of the road network and/or a portion thereof. For example, each potential DFC corridor may be defined by an origin and a destination. The potential DFC corridor may be taken as a generally straight and/or direct line from the origin to the destination. For example, when the potential DFC corridor is projected onto the surface of the earth, the potential DFC corridor is approximately a straight line and/or a direct path from the origin to the destination. In three-dimensional space, a potential DFC corridor may be defined as an arc or arch from the origin to the destination having some maximum height above the surface of the earth at some point between the origin and the destination.

In an example embodiment, the ranking of the potential DFC corridors is based on the ability of the potential DFC corridor to prevent or reduce travel delay for a DFC traveling from the origin to the destination compared to a vehicle traveling along the existing road network from the origin to the destination. For example, a traffic metric corresponding to the origin and destination and indicating a volume of traffic traveling along the existing road network from the origin to the destination, traffic conditions along the existing road network from the origin to the destination, travel time from the origin to the destination along the existing road network, and/or the like, and/or a combination thereof. The potential DFC corridors may then be ranked according to the traffic metric. In an example embodiment, the traffic metric is a total delay. In an example embodiment, the total delay is determined by a combination of the volume of traffic traveling along the existing road network from the origin to the destination, traffic conditions along the existing road network from the origin to the destination, and extra travel length or extra travel time driven from the origin to the destination along the existing road network. In an example embodiment, a first potential DFC corridor corresponding to a first total delay may be ranked as more potentially beneficial or as augmenting the existing road network better than a second potential DFC corridor corresponding to a second total delay if the first total delay is larger or longer than the second total delay.

In an example embodiment, the ranked potential DFC corridors may be provided for use in city and/or transportation network planning processes. For example, a list or map display of one or more potential DFC corridors may be displayed via the user interface of the corridor determination apparatus or another computing entity in communication therewith. In another example, a geographic database comprising map information/data may be updated to include one or more potential DFC corridors records and the geographic database may be used as input to a city and/or transportation network planning model, and/or the like. Thus, various embodiments provide for the identification, determination, and/or generation of potential DFC corridors, the ranking thereof, and the provision thereof for use in city and/or transportation network planning processes and procedures, for example.

FIG. 1 provides an illustration of an example system that can be used in conjunction with various embodiments of the present invention. As shown in FIG. 1, the system may include one or more corridor determination apparatuses 10, a plurality of vehicle apparatuses 20, wherein each vehicle apparatus 30 is disposed on a vehicle 5, one or more other computing entities 30, one or more networks 50, and/or the like. In various embodiments, the vehicle apparatus 20 may be an in vehicle navigation system, vehicle control system, a mobile computing device, and/or the like. For example, a vehicle apparatus 30 may be an in vehicle navigation system mounted within and/or be onboard a vehicle 5 such as a motor vehicle, non-motor vehicle, automobile, car, scooter, truck, van, bus, motorcycle, bicycle, Segway, golf cart, and/or the like. In an example embodiment, the vehicle apparatus 20 may be a vehicle control system configured to autonomously drive a vehicle 5, assist in control of a vehicle 5, monitor various aspects of the vehicle 5 (e.g., fault conditions, motor oil status, battery charge level, fuel tank fill level, and/or the like) and/or the like. In some embodiments, a vehicle apparatus 20 may be onboard a personal vehicle, commercial vehicle, public transportation vehicle, fleet vehicle, and/or other vehicle. In various embodiments, the vehicle apparatus 20 may be a smartphone, tablet, personal digital assistant (PDA), personal computer, desktop computer, laptop, and/or other mobile computing device. In an example embodiment, the corridor determination apparatus 10 may be a server, group of servers, distributed computing system, and/or other computing system. For example, the corridor determination apparatus 10 may be in communication with a plurality of vehicle apparatuses 20, one or more other computing entities 30, and/or the like via one or more wired or wireless networks 50.

In an example embodiment, a corridor determination apparatus 10 may comprise components similar to those shown in the example corridor determination apparatus 10 diagrammed in FIG. 2A. In an example embodiment, the corridor determination apparatus 10 is configured to receive a plurality of instances of probe information/data from a plurality of vehicle apparatuses 20; identify, determine, generate, and/or the like one or more potential DFC corridors; determine, calculate, compute, and/or the like a traffic metric corresponding to each of the one or more potential DFC corridors; rank the potential DFC corridors based on the corresponding traffic metrics; provide the one or more potential DFC corridors and the corresponding ranking; and/or the like. For example, as shown in FIG. 2A, the corridor determination apparatus 10 may comprise a processor 12, memory 14, a user interface 18, a communications interface 16, and/or other components configured to perform various operations, procedures, functions or the like described herein. In at least some example embodiments, the memory 14 is non-transitory.

In an example embodiment, a vehicle apparatus 20 is onboard a vehicle 5. In an example embodiment, the vehicle apparatus 20 may be configured to provide navigation and/or route information/data to a user (e.g., an operator of the vehicle 5). In an example embodiment, the vehicle apparatus 20 may be configured to autonomously drive a vehicle 5 and/or assist in control of a vehicle 5 in accordance with navigation and/or route information. In an example embodiment, the vehicle apparatus 20 may be configured to gather, collect, capture, and/or the like probe information/data as the vehicle 5 moves through the road network and/or a portion thereof. For example, the probe information/data may comprise a time stamp indicating the time that the probe information/data was gathered, collected, captured and/or the like. In an example, the probe information/data may comprise position information/data corresponding to a location of the vehicle 5 at the time the probe information/data was gathered, collected, captured, and/or the like.

In an example embodiment, as shown in FIG. 2B, the vehicle apparatus 20 may comprise a processor 22, memory 24, a communications interface 26, a user interface 28, one or more sensors 29 (e.g., a location sensor such as a GNSS sensor; IMU sensors; camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the vehicle apparatus 20 to determine one or more features of the corresponding vehicle's 5 surroundings and/or monitor the vehicle's 5 operating parameters), and/or other components configured to perform various operations, procedures, functions or the like described herein. In at least some example embodiments, the memory 24 is non-transitory.

In an example embodiment, the corridor determination apparatus 10 may be in communication with a plurality of vehicle apparatuses 20 and, optionally, one or more other computing entities 30. For example, the corridor determination apparatus 10 may be in communication with a computing entity 30 operated by and/or on behalf of an organization, group, individual and/or the like performing city and/or transportation network planning processes or procedures. For example, the corridor determination apparatus 10 may be in communication with a department of transportation computing entity, an office of city planning computing entity, a computing entity corresponding to a contractor or consultant affiliated with a department of transportation or city planning office, and/or the like. In an example embodiment, a computing entity 30 may comprise similar elements to the corridor determination apparatus 10 and/or the vehicle apparatus 20. For example, the computing entity 30 may comprise a processor, memory, a user interface, a communications interface, and/or the like. In an example embodiment, the computing entity 30 may comprise one or more sensors similar to sensor(s) 29.

Each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network, and/or the like. In some embodiments, a network 50 may comprise the automotive cloud, digital transportation infrastructure (DTI), radio data system (RDS)/high definition (HD) radio or other digital radio system, and/or the like. For example, a vehicle apparatus 20 may be in communication with a corridor determination apparatus 10 via the network 50. For example, a vehicle apparatus 20 may communicate with the corridor determination apparatus 10 via a network, such as the Cloud. For example, the Cloud may be a computer network that provides shared computer processing resources and data to computers and other devices connected thereto. For example, the vehicle apparatus 20 may be configured to receive one or more map tiles of a digital map from the corridor determination apparatus 10 or another map service connected via the network 50, traffic information/data (embedded in a map tile of a digital map and/or separate therefrom), and/or provide probe information/data to the corridor determination apparatus 10.

Certain example embodiments of the vehicle apparatus 20 and the corridor determination apparatus 10 are described in more detail below with respect to FIGS. 2A and 2B.

II. Example Operation

Example embodiments provide methods, apparatus, systems, computer program products, and/or the like for identifying, determining, generating, and/or the like one or more potential DFC corridors; determining, calculating, computing, and/or the like a traffic metric corresponding to each of the one or more potential DFC corridors; ranking the potential DFC corridors based on the corresponding traffic metrics; and/or providing the one or more potential DFC corridors and the corresponding ranking.

In an example embodiment, one or more potential DFC corridors are identified based on the topology of a road network and/or a portion thereof. For example, a corridor determination apparatus 10 may analyze the topology of a road network and/or a portion thereof and identify one or more potential DFC corridors. For example, for one or more OD pairs of the road network, a potential DFC corridor may be identified. In an example embodiment, potential DFC corridors may be identified by determining if a direct path from the origin to the destination is shorter than a path (e.g., the shortest path, the fastest path) from the origin to the destination along the road network. In an example embodiment, a direct path from the origin to the destination may be a straight line or an approximately straight line from the origin to the destination. In an example embodiment, potential DFC corridors may be identified by determining if the difference in distance between a direct path from the origin to the destination and a road network path (e.g., the shortest path, the fastest path) from the origin to the destination along the road network satisfies a predetermined difference threshold.

In an example embodiment, one or more traffic metrics may be determined for each identified potential DFC corridor. For example, a corridor determination apparatus 10 may determine one or more traffic metrics for each identified potential DFC corridor. For example, a traffic metric may be determined based on a plurality of instances of probe information/data received from a plurality of vehicle apparatuses 20. Example traffic metrics include a volume of traffic along a path from the origin to the destination (e.g., a shortest path, a fastest path) through the road network, traffic conditions along a path from the origin to the destination (e.g., a shortest path, a fastest path) through the road network (e.g., a comparison of actual traffic speed to free flow traffic speed, a comparison of actual travel time to a free flow travel time), a travel time along a path from the origin to the destination (e.g., a shortest path, a fastest path) through the road network, an extra travel length or an extra travel time driven for the road network path compared to the direct path for the OD pair, and/or the like, and/or a combination thereof. In an example embodiment, the traffic metric is a total delay determined based on a volume of traffic along a road network path from the origin to the destination (e.g., a shortest path, a fastest path) through the road network, traffic conditions along a road network path from the origin to the destination (e.g., a shortest path, a fastest path) through the road network (e.g., a comparison of actual traffic speed to free flow traffic speed, a comparison of actual travel time to a free flow travel time), and an extra travel length or an extra travel time driven along a road network path from the origin to the destination (e.g., a shortest path, a fastest path) through the road network compared to the direct path from the origin to the destination.

In an example embodiment, the potential DFC corridors are ranked based on the determined traffic metrics. For example, the corridor determination apparatus 10 may rank the potential DFC corridors based on the corresponding traffic metrics. In an example embodiment, the potential DFC corridors, and optionally the corresponding rankings of the potential DFC corridors, are provided. For example, the potential DFC corridors may be provided in a list and/or map format via a user interface of the corridor determination apparatus 10. In another example, the potential DFC corridors may be provided to another computing entity 30 to be displayed in a list and/or map format via a user interface of the computing entity 30, as elements of a map database for use as input to a city and/or transportation network planning simulation, calculation, and/or the like, or used in some other manner to perform city and/or transportation network planning processes and/or procedures.

FIG. 3 provides a flowchart illustrating an example operation of a corridor determination apparatus 10, according to an example embodiment, to provide one or more potential DFC corridors and a corresponding ranking of at least some of the one or more potential DFC corridors. Starting at block 302, a plurality of potential DFC corridors are identified. For example, the corridor determination apparatus 10 may identify a plurality of potential DFC corridors. For example, the corridor determination apparatus 10 may comprise means, such as processor 12, memory 14, and/or the like, for identifying a plurality of potential DFC corridors.

In an example embodiment, the potential DFC corridors are identified based on the topology of the road network and/or a portion of the road network under consideration. For example, the corridor determination apparatus 10 may store in memory 14 and/or have access to (e.g., via communication interface 16) a geographic database or other data store comprising map information/data. The map information/data may provide a road network topology. For example, the map information/data may provide a plurality of nodes and/or points of interest (e.g., the location of the nodes and/or points of interest) and paths between the nodes and/or points of interest. In an example embodiment, the map information/data may further provide additional map information/data such as, for example, the free flow speed along paths and/or one or more portions of the paths between nodes and/or points of interest, the length of the paths between the nodes and/or points of interest, and/or the like. In an example embodiment, a node may correspond to an intersection of the existing road network and a point of interest may correspond to an address or location within the existing road network. For example, a point of interest may correspond to a gasoline station, hotel, restaurant, museum, stadium, office, automobile dealership, auto repair shop, building, store, park, parking lot, apartment complex, etc. The location of the nodes, points of interest, and the paths between the nodes/points of interest may be provided by the map information/data such that the distances between two given nodes and/or points of interest along a path of the road network may be determined (e.g., by the corridor determination apparatus 10). In an example embodiment, each node and/or point of interest or a subset of the nodes and/or points of interest of the road network are selected as origins and/or destinations. Thus, based on the map information/data a set of origins and destinations are identified.

In an example embodiment, a road network path is identified for each OD pair from the set of origins and destinations. For example, for each origin in the set of origins and destinations, a road network path is identified. A road network path for an OD pair is a path through the road network from the origin to the destination of the OD pair. In an example embodiment, the road network path may be the shortest path through the road network or the fastest path (at a particular time, under free flow conditions, and/or the like) through the road network from the origin to the destination. In another example embodiment, any path traveled by a vehicle 5 of the plurality of vehicles 5 from the origin to the destination through the road network may be considered.

In an example embodiment, a direct path is identified for each OD pair from the set of origins and destinations. Based on the map information/data, the length of a direct path from the origin to the destination is determined. For example, the direct path is a straight line from the origin to the destination projected on the surface of the earth, in an example embodiment. In another example embodiment, a direct path is a straight line from the origin to the destination that curves, dog-legs, and/or the like around any impediment taller than a predetermined height (e.g., five feet, ten feet, 15 feet, 100 feet, and/or the like). For example, if a building is in the straight line path between the origin and the destination, the direct path may curve, dog-leg, and/or the like around the footprint of the building. In an example embodiment, the direct path for an OD pair may be automatically determined by the corridor determination apparatus 10.

In an example embodiment, it may then be determined if the direct path for an OD pair satisfies a selection criteria. In an example embodiment, if the direct path for an OD pair satisfies the selection criteria, the direct path is identified as a potential DFC corridor. In an example embodiment, the selection criteria comprises a predetermined difference threshold. For example, if the difference in length between the road network path for the OD pair and the direct path for the OD pair satisfies (e.g., is greater than) the predetermined difference threshold, the direct path between the origin and the destination may be selected as a potential DFC corridor. In an example embodiment, the direct path satisfies the selection criteria if the length of the direct path for the OD pair is shorter than the length of the road network path for the OD pair. In an example embodiment, the direct path satisfies the selection criteria if the extra travel length along the road network path compared to the direct path satisfies (e.g., is greater than) a predetermined length threshold and/or the extra travel time driven along the road network path compared to the direct path satisfies (e.g., is greater than) a predetermined time threshold. In an example embodiment, an extra length driven (ELD) is determined by ELD=Distance$_{OD}$–Displacement$_{OD}$, wherein Distance$_{OD}$ is the distance from the origin to the destination along a road network path and Displacement$_{OD}$ is the distance from the origin to the destination along a direct path. In an example embodiment, an extra travel time driven (ETTD) is determined by $$ETTD = \frac{ELD}{Speed_{FreeFlow}} = \frac{Distance_{OD} - Displacement_{OD}}{Speed_{FreeFlow}},$$

wherein speed$_{FreeFlow}$ is the free flow speed along the road network path. For example, the extra travel time driven for an OD pair may be determined by determining the difference in length between the road network path for the OD pair and the direct path for the OD pair and dividing that difference in length by the free flow speed of the road network path. In an example embodiment, the free flow speed of the road network path is the speed at which a vehicle 5 would travel the road network path if the vehicle 5 is not slowed by traffic conditions. For example, in an example embodiment, the free flow speed of the road network path may be the speed limit along the road network path. In an example embodiment, the selection criteria may correspond to another measure of the efficiency or inefficiency of the road network topology as it pertains to driving from the origin to the destination of the OD pair in terms of travel time and expected time of arrival, independent of traffic congestions, number of turns, and/or the like along the road network path.

Thus, one or more potential DFC corridors may be identified, according to an example embodiment. Each potential DFC corridor corresponds to OD pair, wherein the origin and the destination of the OD pair are nodes or points of interest in the existing road network as represented by the map information/data.

At block 304, instances of probe information/data are received. For example, the corridor determination apparatus 10 may receive a plurality of instances of probe information/data that were captured and/or provided by a plurality of vehicle apparatuses 20. For example, the corridor determination apparatus 10 may comprise means, such as processor 12, communication interface 16, and/or the like, for receiving a plurality of instances of probe information/data that were captured and/or provided by a plurality of vehicle apparatuses 20. Each vehicle apparatus 20 may be onboard a vehicle 5. The vehicle apparatus 20 may be configured to capture instances of probe information/data as the vehicle 5 travels through the road network. The vehicle apparatus 20 may then provide the instances of probe information/data via one or more networks 50 (e.g., via the communication interface 26).

In an example embodiment, an instance of probe information/data may comprise position information/data indicating the location of the vehicle apparatus 20 and/or the corresponding vehicle 5 when the instance of probe information/data was gathered, collected, captured, and/or the like. For example, the vehicle apparatus 20 may comprise one or more sensors 29. The sensors 29 may include a location sensor configured to capture position information/data and determine a location of the vehicle apparatus 20 and/or the corresponding vehicle. In an example embodiment, an instance of probe information/data comprises a timestamp indicating a time (e.g., a universal time) at which the instance of probe information/data was gathered, collected, captured, and/or the like. In an example embodiment, the timestamp may be determined and/or the like by the location sensor (e.g., a GNSS sensor). In another example embodiment, vehicle apparatus 20 may comprise a clock and/or processor clock and the timestamp may be determined based on the clock and/or processor clock. In an example embodiment, an instance of probe information/data may comprise speed information/data indicating the speed at which the vehicle was traveling when the instance of probe information/data was gathered, collected, captured, and/or the like. In an example embodiment, the speed information/data may be an average speed of the vehicle over a time window. In an example embodiment, the time window may be one second, five seconds, thirty seconds, one minute, the time since the Thus, the plurality of instances of probe information/data provided by a first vehicle apparatus 20 represent one or more trajectories of the first vehicle apparatus 20 and/or a corresponding first vehicle 5 through the road network and the provides an indication of the time taken for the vehicle 5 to drive along the one or more trajectories.

The vehicle apparatus 20 may transmit instances of probe information/data as the probe information/data is gathered, captured, collected, and/or the like or may provide a batch of instances of probe information/data at a time. For example, the vehicle apparatus may provide a plurality of instances of probe information/data every minute, every five minutes, and/or the like as the vehicle 5 moves through the road network. The corridor determination apparatus 10 may receive the probe information/data from the vehicle apparatuses 20 (and/or via one or more intermediary computing entities and/or networks 50). In an example embodiment, the corridor determination apparatus 10 may store the plurality of instances of probe information/data provided from a plurality of vehicle apparatuses 20 in a database or other data store.

At block 306, microscopic OD matrices are generated for a plurality of vehicles 5. For example, the corridor determination apparatus 10 may identify one or more vehicle trajectories corresponding to movement of the vehicle 5 through the road network and/or a portion thereof based on the plurality of instances of probe information/data received from the vehicle apparatus 20 corresponding to the vehicle 5. For example, a vehicle trajectory may correspond to a vehicle's 5 movement along a path corresponding to an OD pair (e.g., beginning at the origin and ending at the destination) through the road network. For each vehicle trajectory, a microscopic OD matrix may be generated. For example, the corridor determination apparatus 10 may generate a microscopic OD matrix for one or more and/or each vehicle trajectory identified from the plurality of instances of probe information/data. For example, the corridor determination apparatus 20 may comprise means, such as the processor 12 and/or the like, for generating a microscopic OD matrix for one or more and/or each vehicle trajectory identified from the plurality of instances of probe information/data. In an example embodiment, each vehicle trajectory begins at an origin and travels through the road network to a destination. As the vehicle trajectory travels through the road network, the vehicle trajectory may pass by one or more nodes or points of interest in the set of origins and destinations. Thus, in an example embodiment, a vehicle trajectory may be divided into multiple microscopic trajectories between nodes or points of interest in the set of origins and destinations. The probe information/data may be used to determine the length of time the corresponding vehicle 5 took to travel along each of the microscopic trajectories. For example, the time difference between the timestamp when the vehicle 5 reaches the destination node or point of interest of a microscopic trajectory and the when the vehicle 5 departed the origin node or point of interest of the microscopic trajectory provides a time taken for traveling the microscopic trajectory. In an example embodiment, a microscopic OD matrix is a matrix, array, data structure, and/or the like comprising the travel time of the vehicle 5 along each microscopic trajectory of a vehicle trajectory identified in the plurality of instances of probe information/data provided by a particular vehicle apparatus 20 and corresponding to the movements of the corresponding vehicle 5 through the road network. In an example embodiment, a microscopic OD matrix is a matrix, array, data structure, and/or the like indicating the vehicle trajectory and the microscopic trajectories corresponding to the vehicle trajectory.

FIGS. 4A, 4B, and 4C provide a schematic diagram of how a microscopic OD matrix may be determined and two example microscopic OD matrices 400 (e.g., 400B, 400C). For example, as shown in FIG. 4A, a vehicle 5 may travel a trajectory 410 from an origin at node and/or point of interest A to a destination at node and/or point of interest F. As the vehicle travels from the origin A to the destination F through the road network, the vehicle 5 may pass by and/or travel through nodes and/or points of interest B, C, D, and E. Thus, the vehicle trajectory 410 A to F may comprise the microscopic trajectories 405 A to B, B to C, C to D, D to E, E to F, A to C, B to D, C to E, D to F, A to D, B to E, D to F, A to E, and B to F. As should be understood, each microscopic trajectory 405 corresponds to a path through the road network comprising one or more links or road segments. FIG. 4B illustrates an example travel time microscopic OD matrix 400B corresponding to the vehicle trajectory from origin A to destination F that comprises the travel time of the vehicle 5 along the vehicle trajectory 410 and each of the microscopic trajectories 405. For example, the vehicle trajectory from origin A to destination F may correspond to travel time of 8.8 minutes while the microscopic trajectory A to B may correspond to travel time of 1.5 minutes, according to the vehicle trajectory identified from the plurality of instances probe information/data provided by the vehicle 5. FIG. 4C illustrates another example of a microscopic OD matrix 400C (e.g., a volume microscopic OD matrix) indicating the vehicle trajectory 410 and the microscopic trajectories 405 traveled by the vehicle 5. In an example embodiment, the rows of the microscopic OD matrix 400 indicate the upstream node or point of interest and the columns of the microscopic OD matrix indicate the downstream node or point of interest. In an example embodiment, a microscopic trajectory 405 may be a road segment or link defined by two adjacent intersections, nodes or points of interest. For example, a microscopic trajectory may correspond to traveling along Main Street from 100 Main Street to 199 Main Street. In an example embodiment, the plurality of microscopic OD matrices 400 generated based the plurality of instances of probe information/data provided by the plurality of vehicle apparatuses 20 provides information/data regarding the volume of traffic along a path of the road network and the travel time along the path of the road network. In an example embodiment, for each vehicle trajectory 410 identified in the plurality of instances of probe information/data provided by the plurality of vehicle apparatuses 20, both a travel time microscopic OD matrix 400B (e.g., as shown in FIG. 4B) and a volume microscopic OD matrix 400C (e.g., as shown in FIG. 4C) may be generated.

Continuing with FIG. 3, at block 308, the microscopic OD matrices 400 are aggregated to generate an OD matrix 500. For example, one or more (or each) of the microscopic OD matrices 400 generated based on the plurality of instances of probe information/data provided by the plurality of vehicle apparatuses 20 may be aggregated to generate and/or form an OD matrix 500. For example, the corridor determination apparatus 10 may aggregate the microscopic OD matrices 400 to generate an OD matrix 500. For example, the corridor determination apparatus 10 may comprise means, such as the processor 12 and/or the like, for aggregating the microscopic OD matrices 400 to generate an OD matrix 500.

FIG. 5A provides a schematic of a road network and/or a portion of a road network under consideration 510 comprising 14 nodes and/or points of interest and a set of links and/or road segments (shown as solid lines) connecting the nodes and/or points of interest. The arrows on some of the links and/or road segments indicate that traffic along the link and/or road segment is only allowed to travel in one direction, as indicated by the arrow. FIG. 5A also shows three vehicle trajectories 505A, 505B, and 5050C shown as the dotted line, the dashed line, and the dot-dashed line. FIG. 5B provides an example OD matrix 500 corresponding to the three vehicle trajectories 505A, 505B, 505C shown in FIG. 5A. In particular, the OD matrix 500 shown in FIG. 5A indicates a relative volume of vehicles 5 traveling from an origin node and/or point of interest, as indicated by the rows of the OD matrix, to a destination node and/or point of interest, as indicated by the columns of the OD matrix for each of the nodes and/or points of interest in the road network and/or the portion of the road network under consideration. For example, the OD matrix 500 indicates a relative volume of vehicle 5 traveling along a path corresponding to an OD pair for each OD pair of the road network and/or portion thereof. In an example embodiment, the OD matrix 500 may comprise a travel time indicator (e.g., an mean travel time, median travel time, mode travel time, range of travel times, and/or the like) indicating an expected or likely travel time for traveling from an origin node and/or point of interest to a destination node and/or point of interest through the road network. The travel time indicator may be determined based on the probe information/data, in an example embodiment. For example, the travel times from the microscopic OD matrices 400B may be analyzed to determine a travel time indicator for each OD pair of the OD matrix 500. For example, in the illustrated example of FIGS. 5A and 5B, two vehicle trajectories 505A and 505B pass through the road network 510 from origin node and/or point of interest 4 to destination node and/or point of interest 5. The travel times indicated by those two trajectories (e.g., as indicated in the corresponding microscopic matrices 400B) may be analyzed (e.g., averaged) to determine the travel time indicator (e.g., mean travel time). In an example embodiment, both a travel time OD matrix 500 (e.g., comprising a travel time indicator for each OD pair and generated by aggregating the travel time microscopic OD matrices 400B) and a volume microscopic OD matrix 500 (e.g., comprising a number of unique vehicles for each OD pair and generated by aggregating the volume microscopic OD matrices 400C) may be generated. In an example embodiment, a single OD matrix 500 may be generated that includes both the travel time and volume information/data.

Continuing with FIG. 3, at block 310, a delay metric is determined. In an example embodiment, a delay metric is determined for each OD pair of the OD matrix. In an example embodiment, a delay metric is determined for reach OD pair corresponding to an identified potential DFC corridor. In an example embodiment, the delay metric is a delay multiple metric. In an example embodiment, the delay multiple metric is a ratio of the actual travel time along a path correspond to an OD pair to the free flow travel time along the path corresponding to the OD pair. For example, the delay multiple (DM) metric may be determined by $$DM = \frac{TT_{RealTime}}{TT_{FreeFlow}} = \frac{Speed_{FreeFlow}}{Speed_{FreeTime}} \geq 1,$$

wherein $TT_{RealTime}$ is the real time travel time along the road network path as determined based on the plurality of instances of probe information/data, $TT_{FreeFlow}$ is the travel time along the road network path under free flow conditions (e.g., vehicles are able to travel along the road network path at the free flow speed, speed limit, and/or the like), $Speed_{FreeFlow}$ is the free flow speed along the road network path (e.g., the speed limit), and $Speed_{RealTime}$ is the real time speed along the road network path as determined based on the plurality of instances of probe information/data. The travel time ratio and the speed ratio are equivalent as the ratios refer to the same distance (e.g., the distance of the road network path from the origin to the destination). For example, the actual travel time along the path corresponding to the OD pair may be determined and/or identified based on the travel time indicator of the OD matrix (e.g., the travel time OD matrix) for the path corresponding to the OD pair. For example, the OD matrix may provide a travel time indicator indicating that the mean travel time along the path corresponding to the OD pair is five minutes. The free flow travel time may be determined by multiplying the free flow speed along the path by the length of the path. For example, it may be determined that the free flow time for the path corresponding to the OD pair is 4 minutes. Thus, in this example, the delay multiple metric is 5/4. In another example, a delay metric may be determined for each trajectory and/or microscopic trajectory identified from the plurality of instances of probe information/data provided by the plurality of vehicle apparatuses 20 and the average delay metric for each path and/or corresponding OD pair may be determined. For example, $$avgDM(OD_{ij}) = \frac{\sum_{t=1}^{T} DM_{ij}(t)}{T},$$

wherein $avgDM(OD_{ij})$ is the average delay metric for origin $O_i$ and destination $D_j$, which is determined by summing the individual delay metrics $DM_{ij}$ each corresponding to the traversal of a vehicle 5 along a road network path from origin $O_i$ to destination $D_j$ for a set of T vehicle 5 traversals of the road network path from origin $O_i$ to destination $D_j$. For example, the corridor determination apparatus 10 may determine a delay metric for each OD pair of the OD matrix. For example, the corridor determination apparatus 10 may comprise means, such as the processor 12, memory 14 storing map information/data, and/or the like, for determining a delay metric for each OD pair of the OD matrix.

At block 312, a traffic metric is determined for one or more OD pairs. For example, a traffic metric may be determined for each OD pair of the OD matrix, for each OD pair corresponding to an identified potential DFC corridor, and/or the like. In an example embodiment, the traffic metric corresponding to an OD pair considers the volume of traffic traveling along a path (e.g., shortest path, fastest path) through the road network and corresponding to the OD pair, traffic conditions along the path corresponding to the OD pair, a measure of the topology of the road network corresponding to the path corresponding to the OD pair, and/or the like, and/or a combination thereof. In an example embodiment, the traffic metric is a total delay. In an example embodiment, the total delay corresponding to an OD pair is determined by a combination of the volume of traffic along a path (e.g., shortest path, fastest path) through the road network and corresponding to the OD pair, traffic conditions along the path corresponding to the OD pair, and travel time along the path corresponding to the OD pair. In an example embodiment, the measure of the topology of the road network is the extra travel time driven or a travel time for driving the path through the road network and corresponding to the OD pair. For example, the total delay (TD) for an OD pair may be determined by Total Delay (TD)=ETTD*DM*V or $$\text{Total Delay } (TD) = \frac{Distance_{OD} - Displacement_{OD}}{Speed_{FreeFlow}} * \frac{TT_{RealTime}}{TT_{FreeFlow}} * UniqueVehicles,$$

in an example embodiment.

For example, in an example embodiment, the total delay for a path corresponding to an OD pair is the product of multiplying the extra travel time driven, the delay metric (e.g., the delay multiple metric), and the volume of unique vehicles 5 that traveled along the path corresponding to the OD pair. In various embodiments, the extra travel time driven may be determined when identifying potential DFC corridors at different part of the process. For example, the extra travel time driven may be determined based on the road network topology as indicated by the map information/data as described above. In an example embodiment, the delay metric is the multiple delay metric determined based on the OD matrix, at least some of the plurality of instances of probe information/data provided by the plurality of vehicle apparatuses 20, and/or the like. In an example embodiment, the volume of unique vehicles 5 that traveled along the path corresponding to the OD pair may be determined based on the OD matrix (e.g., the volume OD matrix). Thus, the total delay corresponding to an OD pair is an example traffic metric that is dependent on the topology of the road network, the volume of traffic using a path through the road network corresponding to the OD pair, and the traffic conditions (e.g., congestion, delay, and/or the like) corresponding to the traffic using the path through the road network corresponding to the OD pair (e.g., the ability of the path through road network corresponding to the OD pair to efficiently handle the volume of traffic using the path). In general, the total delay provides an indication of how helpful the corresponding potential DFC corridor may be to a drone or flying car in saving time while traveling from the origin to the destination of the corresponding OD pair. In an example embodiment, the total delay provides an indication of how helpful it would be to traffic traveling through the road network to have a DFC corridor implemented from the origin to the destination of the corresponding OD pair. In an example embodiment, the total delay provides an indication of how well a DFC corridor implemented from the origin to the destination of the corresponding OD pair would augment the existing road network.

At block 314, the potential DFC corridors may be ranked based on the determined traffic metrics. For example, each potential DFC corridor corresponds to an OD pair for which a traffic metric has been determined. The potential DFC corridors may be ranked based on the traffic metric. For example, a first potential DFC corridor corresponding to a first traffic metric may be ranked higher than a second potential DFC corridor corresponding to a second traffic metric if the first and second traffic metrics indicate that first potential DFC corridor is more important, more desired, more helpful, and/or the like than the second potential DFC corridor. For example, in an example embodiment wherein the traffic metric is total delay, the potential DFC corridor corresponding to the highest or greatest traffic delay is ranked highest, the potential DFC corridor corresponding to the second highest or second greatest traffic delay is ranked second highest, etc. for example, the corridor determination apparatus 10 may rank the potential DFC corridors based on the corresponding traffic metrics. For example, the corridor determination apparatus 10 may comprise means, such as the processor 12 and/or the like for ranking the potential DFC corridors based on the corresponding traffic metrics.

At block 316, the ranked potential DFC corridors may be provided. For example, the corridor determination apparatus 10 may provide the potential DFC corridors and the corresponding ranks. For example, the corridor determination apparatus 10 may comprise means, such as the processor 12, communication interface 16, user interface 18, and/or the like, for providing the potential DFC corridors and the corresponding ranks. In an example embodiment, the potential DFC corridors and/or a portion thereof (e.g., the 10%, 15%, 20%, 10, 15, or 20 most highly ranked potential DFC corridors) and the corresponding rankings may be displayed via the user interface of the corridor determination apparatus 10 or provided (e.g., transmitted) to another computing entity 30. In an example embodiment, the potential DFC corridors and/or a portion thereof and, optionally, the corresponding rankings may be provided to the computing entity 30 to be displayed via a user interface thereof. For example, the potential DFC corridors and/or a portion thereof may be provided as a ranked list. In another example, the potential DFC corridors and/or a portion thereof may be provided as a layer of map or map tile. For example, the potential DFC corridors may be added to the map information/data such that the map information/data comprises one or more potential DFC corridor records. The one or more potential DFC corridor records may then be used to render a map showing one or more potential DFC corridors. In another example, the potential DFC corridor records may be used as input to one or more simulations and/or the like corresponding to a city and/or transportation network planning procedure.

FIG. 6 provides an example graphical user interface (GUI) 600 for providing at least some of the potential DFC corridors of a road network and/or a portion of a road network being considered. For example, the GUI 600 may be provided via the user interface 18 of the corridor determination apparatus 10 or via a user interface of another computing entity 30. In the illustrated embodiment, the GUI 600 comprises a map portion 610 and a list portion 620. The map portion 510 illustrates the considered portion of the road network and one or more (e.g., four and/or the highest ranked 25%) of the potential DFC corridors. The list portion 620 provides a ranked list of the potential DFC corridors. The identified potential DFC corridors and the corresponding rankings may then be used to perform one or more city and/or transportation network planning procedures and/or processes.

As should be understood, the plurality of instances of probe information/data provided by the plurality of vehicle apparatuses 20 may be divided into data groupings based on time of day, day of the week, and/or the like. For example, a list of potential DFC corridors and corresponding rankings may be determined for various times of day, days of the week, and/or the like. For example, instances of probe information/data corresponding to 7 am to 10 am on weekdays (e.g., captured by the corresponding vehicle apparatus 20 between 7 am and 10 am on a weekday) may be considered to determine a list of potential DFC corridors and corresponding rankings for the time period 7-10 am on weekdays. Similarly, instances of probe information/data corresponding to the weekend (e.g., captured by the corresponding vehicle apparatus 20 on Saturday or Sunday) may be considered to determine a list of potential DFC corridors and corresponding rankings for weekends. As should be understood, various groupings of the plurality of instances of probe information/data may be used to determine corresponding potential DFC corridors and corresponding rankings corresponding to that particular grouping of the probe information/data.

As should be understood, a road network tends to comprise a large number of nodes and/or points of interest. Thus, identifying potential DFC corridors by considering each origin node and/or point of interest and destination node and/or point of interest pair (e.g., each OD pair) of the road network or portion of the road network being considered requires a large amount of computational power. For example, even the road network of a moderately-sized city may comprise thousands of nodes and/or points of interest. Thus, the road network of a moderately-sized city may have a million or more OD pairs that need to be considered to identify potential DFC corridors and rank the identified potential DFC corridors. As such, providing the potential DFC corridors and the corresponding rankings in a reasonable time period requires the use the of computer technology. Moreover, as should be understood based on the teachings provided herein, the identification and ranking of the potential DFC corridors is not biased by human perception of which potential DFC corridors may be the most helpful or may best augment the existing road network. Thus, various embodiments provide the advantage of an automated identification of potential DFC corridors that best augment an existing road network without human biases and/or influences and thereby provides a technical improvement to city and transportation network planning related technologies.

III. Example Apparatus

The vehicle apparatus 20, computing entity 30, and/or corridor determination apparatus 10 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, and/or other device that can perform navigation-related functions, such as digital routing and map display. Additionally or alternatively, the vehicle apparatus 30, user apparatus 20, computing entity 40, and/or corridor determination apparatus 10 may be embodied in other types of computing devices, such as a server, a personal computer, a computer workstation, a laptop computer, a plurality of networked computing devices or the like, that are configured to update one or more map tiles, analyze probe points for route planning or other purposes. In an example embodiment, a vehicle apparatus 30 is an in-vehicle navigation system onboard a vehicle 5 or a mobile device; a corridor determination apparatus 10 is a server; and a computing entity 40 is city and/or transportation network planning system, and/or the like. In this regard, FIG. 2A depicts an example corridor determination apparatus 10 and FIG. 2B depicts an example vehicle apparatus 20 that may be embodied by various computing devices including those identified above. As shown, the corridor determination apparatus 10 of an example embodiment may include, may be associated with, or may otherwise be in communication with a processor 12 and a memory device 14 and optionally a communication interface 16 and/or a user interface 18. Similarly, a vehicle apparatus 20 of an example embodiment may include, may be associated with, or may otherwise be in communication with a processor 22 and a memory device 24 and optionally a communication interface 26, a user interface 28, one or more sensors 29 (e.g., a location sensor such as a GNSS sensor, IMU sensors, and/or the like; camera(s); 2D and/or 3D LiDAR(s); long, medium, and/or short range RADAR; ultrasonic sensors; electromagnetic sensors; (near-)IR cameras, 3D cameras, 360° cameras; and/or other sensors that enable the probe apparatus to determine one or more features of the corresponding vehicle's 5 surroundings), and/or other components configured to perform various operations, procedures, functions, or the like described herein. In example embodiments, a computing entity 30 may, similar to the corridor determination apparatus 10 and/or vehicle apparatus 20, comprise a processor, memory device, communication interface, user interface, and/or one or more additional components configured to perform various operations, procedures, functions, or the like described herein. In an example embodiment, a computing entity 30 may comprise one or more sensors similar to the one or more sensors 29.

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the corridor determination apparatus 10, vehicle apparatus 20, and/or computing entity 30 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multi-threading.

In an example embodiment, the processor 12, 22 may be configured to execute instructions stored in the memory device 14, 24 or otherwise accessible to the processor. For example, the processor 22 may be configured to execute computer-executable instructions embedded within a link record of a map tile and/or provided as part of a conflict-resolved travel plan. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the corridor determination apparatus 10, computing entity 30, and/or vehicle apparatus 20 may include a user interface 18, 28 that may, in turn, be in communication with the processor 12, 22 to provide output to the user, such as one or more potential DFC corridors and the corresponding rankings, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22 (e.g., memory device 14, 24, and/or the like).

The corridor determination apparatus 10, computing entity 30, and/or the vehicle apparatus 20 may optionally include a communication interface 16, 26. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the corridor determination apparatus 10, computing entity 30, and/or vehicle apparatus 20 of an example embodiment, a navigation system may also include or have access to a geographic database that includes a variety of data (e.g., map information/data) utilized in constructing a route or navigation path, determining the time to traverse the route or navigation path, matching a geolocation (e.g., a GNSS determined location) to a point on a map and/or link, and/or the like. For example, a geographic database may include node data records (e.g., including anchor node data records comprising junction identifiers), road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records (e.g., node data records, link data records, POI data records, and/or other data records) may comprise computer-executable instructions, a reference to a function repository that comprises computer-executable instructions, one or more coefficients and/or parameters to be used in accordance with an algorithm for performing the analysis, one or more response criteria for providing a response indicating a result of the analysis, and/or the like. In an example embodiment, the corridor determination apparatus 10 may be configured to modify, update, and/or the like one or more data records of the geographic database. For example, the corridor determination apparatus 10 may modify, update, generate, and/or the like one or more data records of the geographic database such that one or more potential DFC records may be displayed as a layer of a digital map or such that the geographic database may be used as input for a city and/or transportation network planning simulation.

In an example embodiment, the road segment data records are links or segments, e.g., maneuvers of a maneuver graph, representing roads, streets, or paths, as can be used in the calculated route or recorded route information for determination of one or more personalized routes. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database may be updated based on information/data provided by one or more probe apparatuses.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a corridor determination apparatus 10, computing entity 30, and/or vehicle apparatus 20 in accordance with an example embodiment may determine the time to traverse a route that includes one or more turns at respective intersections more accurately.

IV. Apparatus, Methods, and Computer Program Products

As described above, FIG. 3 illustrates a flowchart of a corridor determination apparatus 10, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:

identifying, by a corridor determination apparatus comprising a processor, a memory storing map data encoding a topology of at least a portion of a road network, and a communication interface configured to communicate via at least one network, one or more potential drone and/or flying car (DFC) corridors based on the topology of the at least a portion of the road network, each of the one or more potential DFC corridors corresponding to an origin-destination (OD) pair comprising (a) an origin node or point of interest in the at least a portion of the road network and (b) a destination node or point of interest in the at least a portion of the road network, wherein the identified one or more potential DFC corridors have a difference between a direct path from the origin node to the destination node and a road network path from the origin node to the destination node along the road network greater than a predetermined difference threshold;

receiving, by the corridor determination apparatus, a plurality of instances of probe data from a plurality of vehicle apparatuses, wherein (a) each vehicle apparatus is onboard a vehicle, (b) each vehicle apparatus comprises a location sensor, and (c) each instance of probe data comprises position data, the position data indicates a location of the vehicle at a time when the position data was captured and is determined by the location sensor;

determining, by the corridor determination apparatus, trajectories through the at least a portion of the road network traveled by one or more vehicle apparatuses of the plurality of vehicle apparatuses, the determining of the trajectories based at least in part on the plurality of instances of probe data and the map data;

determining, by the corridor determination apparatus and based on the trajectories, a volume of traffic for a path through the at least a portion of the road network corresponding to the OD pair for each potential DFC corridor of the one or more potential DFC corridors;

determining, by the corridor determination apparatus and based on the trajectories and instances of probe data corresponding to the trajectories, a delay metric indicating traffic conditions along the path through the at least a portion of the road network corresponding to the OD pair for each potential DFC corridor of the one or more potential DFC corridors;

determining, by the corridor determination apparatus, a traffic metric for the path through the at least a portion of the road network corresponding to the OD pair for each potential DFC corridor of the one or more potential DFC corridors, the traffic metric determined based on a combination of the volume of traffic, the delay metric, and a measure of the topology of the road network, ranking the one or more potential DFC corridors based on the corresponding traffic metrics to augment the road network.

2. A method according to claim 1, further comprising:

generating an OD matrix based on the trajectories, the OD matrix providing at least one of (a) volume of traffic data for OD pairs of the OD matrix or (b) a travel time indicator for OD pairs of the OD matrix, wherein at least one of (a) the volume of traffic for a path through the at least a portion of the road network from the origin node or point of interest and to the destination node or point of interest of each potential DFC corridor of the one or more potential DFC corridors is determined based on the OD matrix or (b) the delay metric indicating traffic conditions along the path through the at least a portion of the road network from the origin node or point of interest and to the destination node or point of interest of each potential DFC corridor of the one or more potential DFC corridors is determined based on the OD matrix.

3. A method according to claim 2, further comprising:
generating one or more microscopic OD matrices based on corresponding trajectories, the microscopic OD matrix providing at least one of (a) an indication of a vehicle corresponding to a trajectory traveling along a path of the road network, or (b) a travel time for the vehicle to travel along the path of the road network,
wherein the OD matrix is generated by aggregating the one or more microscopic OD matrices.

4. A method according to claim 1, wherein the volume of traffic provides an indication of the number of unique vehicles traveling along a first path through the at least a portion of the road network from a first origin node or point of interest and to a first destination node or point of interest of a first potential DFC corridor of the one or more potential DFC corridors.

5. A method according to claim 1, wherein the delay metric is a delay multiple metric.

6. A method according to claim 5, wherein the delay multiple metric for a path corresponding to an OD pair is a ratio of an actual travel time, as indicated by one or more trajectories, along a path corresponding to the OD pair and in the road network, to the free flow travel time along the path corresponding to the OD pair and in the road network.

7. A method according to claim 1, wherein the measure of the topology of the road network comprises an extra length driven and an extra travel time driven.

8. A method according to claim 7, wherein the extra travel time driven for a first OD pair is determined by dividing the difference in length of the road network path through the road network from the origin of the first OD pair and to the destination of the first OD pair and the direct path from the origin of the first OD pair and to the destination of the first OD pair by a free flow speed along the road network path; and
wherein the extra length driven for a first OD pair is determined by the difference in length between (a) the road network path through the road network from the origin of the first OD pair and to the destination of the first OD pair and (b) the direct path from the origin of the first OD pair and to the destination of the first OD pair.

9. A method according to claim 1, further comprising providing the ranked potential DFC corridors for display via a user interface or as input to a city and/or transportation network planning calculation.

10. A method according to claim 1, further comprising:
generating potential DFC corridor records for one or more highly ranked potential DFC corridors; and
providing the potential DFC corridor records for adding to the map data, the potential DFC corridor records configured to provide display of the corresponding potential DFC corridors as a layer of a digital map.

11. A method according to claim 1, wherein a first path through the at least a portion of the road network corresponding to a first OD pair is (a) the shortest path through the at least a portion of the road network from the origin node or point of interest to the destination node or point of interest of the first OD pair or (b) the fastest path through the at least a portion of the road network from the origin node or point of interest to the destination node or point of interest of the first OD pair.

12. A method according to claim 1, wherein the predetermined difference threshold comprises a predetermined length threshold and/or a predetermined time threshold.

13. An apparatus comprising at least one processor, a communications interface configured for communicating via at least one network, and at least one memory storing (a) computer program code and (b) map data encoding a topology of at least a portion of a road network, the at least one memory and the computer program code configured to, with the processor, cause the apparatus to at least:
identify one or more potential drone and/or flying car (DFC) corridors based on the topology of the at least a portion of the road network, each of the one or more potential DFC corridors corresponding to an origin-destination (OD) pair comprising (a) an origin node or point of interest in the at least a portion of the road network and (b) a destination node or point of interest in the at least a portion of the road network,
wherein the identified one or more potential DFC corridors have a difference between a direct path and a road network path from the origin node to the destination node greater than a predetermined difference threshold;
receive, via the communication interface, a plurality of instances of probe data from a plurality of vehicle apparatuses, wherein (a) each vehicle apparatus is onboard a vehicle, (b) each vehicle apparatus comprises a location sensor, and (c) each instance of probe data comprises position data, the position data indicates a location of the vehicle at a time when the position data was captured and is determined by the location sensor;
determine trajectories through the at least a portion of the road network traveled by one or more vehicle apparatuses of the plurality of vehicle apparatuses, the determining of the trajectories based at least in part on the plurality of instances of probe data and the map data;
determine, based on the trajectories, a volume of traffic for a path through the at least a portion of the road network corresponding to the OD pair for each potential DFC corridor of the one or more potential DFC corridors;
determine, based on the trajectories and instances of probe data corresponding to the trajectories, a delay metric indicating traffic conditions along the path through the at least a portion of the road network corresponding to the OD pair for each potential DFC corridor of the one or more potential DFC corridors;
determine a traffic metric for the path through the at least a portion of the road network corresponding to the OD pair for each potential DFC corridor of the one or more potential DFC corridors, the traffic metric determined based on a combination of the volume of traffic, the delay metric, and a measure of the topology of the road network,
rank the one or more potential DFC corridors based on the corresponding traffic metrics to augment the road network.

14. An apparatus according to claim 13, wherein the at least one memory and the computer program code are further configured to, with the processor, cause the apparatus to at least:
generate an OD matrix based on the trajectories, the OD matrix providing at least one of (a) volume of traffic data for OD pairs of the OD matrix or (b) a travel time indicator for OD pairs of the OD matrix,
wherein at least one of (a) the volume of traffic for a path through the at least a portion of the road network from the origin node or point of interest and to the destination node or point of interest of each potential DFC corridor of the one or more potential DFC corridors is determined based on the OD matrix or (b) the delay metric indicating traffic conditions along the path through the at least a portion of the road network from the origin node or point of interest and to the destination node or point of interest of each potential DFC corridor of the one or more potential DFC corridors is determined based on the OD matrix.

15. An apparatus according to claim 14, wherein the at least one memory and the computer program code are further configured to, with the processor, cause the apparatus to at least:
generate one or more microscopic OD matrices based on corresponding trajectories, the microscopic OD matrix providing at least one of (a) an indication of a vehicle corresponding to a trajectory traveling along a path of the road network, or (b) a travel time for the vehicle to travel along the path of the road network,
wherein the OD matrix is generated by aggregating the one or more microscopic OD matrices.

16. An apparatus according to claim 13, wherein the volume of traffic provides an indication of the number of unique vehicles traveling along a first path through the at least a portion of the road network from a first origin node or point of interest and to a first destination node or point of interest of a first potential DFC corridor of the one or more potential DFC corridors.

17. An apparatus according to claim 13, wherein (a) the delay metric is a delay multiple metric and (b) the delay multiple metric for a path corresponding to an OD pair is a ratio of an actual travel time, as indicated by one or more trajectories, along a path corresponding to the OD pair and in the road network, to the free flow travel time along the path corresponding to the OD pair and in the road network.

18. An apparatus according to claim 13, wherein the measure of the topology of the road network comprises:
an extra travel time driven, the extra travel time driven for a first OD pair is determined by dividing the difference in length of the road network path through the road network from the origin of the first OD pair and to the destination of the first OD pair and the direct path from the origin of the first OD pair and to the destination of the first OD pair by a free flow speed along the road network path; and
an extra length driven and the extra length driven for a first OD pair is determined by the difference in length between (a) the road network path through the road network from the origin of the first OD pair and to the destination of the first OD pair and (b) the direct path from the origin of the first OD pair and to the destination of the first OD pair.

19. An apparatus according to claim 13, wherein the at least one memory and the computer program code are further configured to, with the processor, cause the apparatus to at least provide the ranked potential DFC corridors for display via a user interface or as input to a city and/or transportation network planning calculation.

20. An apparatus according to claim 13, wherein the at least one memory and the computer program code are further configured to, with the processor, cause the apparatus to at least:
generate potential DFC corridor records for one or more highly ranked potential DFC corridors; and
provide the potential DFC corridor records for adding to the map data, the potential DFC corridor records configured to provide display of the corresponding potential DFC corridors as a layer of a digital map.

* * * * *